US011035478B2

(12) United States Patent
Gandelheidt et al.

(10) Patent No.: US 11,035,478 B2
(45) Date of Patent: Jun. 15, 2021

(54) GATE VALVE, FIXING ELEMENT AND METHOD FOR MOUNTING A GATE VALVE

(71) Applicant: Z & J Technologies GmbH, Dueren (DE)

(72) Inventors: Markus Gandelheidt, Alsdorf (DE); Ralf Heiden, Indien (DE); Robert Puetz, Dueren (DE)

(73) Assignee: Z & J Technologies GmbH, Dueren (DE)

(*) Notice: Subject to any disclaimer, the term of this patent is extended or adjusted under 35 U.S.C. 154(b) by 0 days.

(21) Appl. No.: 15/956,511

(22) Filed: Apr. 18, 2018

(65) Prior Publication Data
US 2018/0306332 A1 Oct. 25, 2018

(30) Foreign Application Priority Data
Apr. 21, 2017 (DE) .................... 10 2017 108 576.9

(51) Int. Cl.
*F16K 3/02* (2006.01)
*F16K 3/18* (2006.01)
(Continued)

(52) U.S. Cl.
CPC ............ *F16K 3/0254* (2013.01); *F16F 1/121* (2013.01); *F16K 3/186* (2013.01); *F16K 3/314* (2013.01); *F16F 1/12* (2013.01); *F16K 3/18* (2013.01)

(58) Field of Classification Search
CPC ........ F16K 3/314; F16K 3/186; F16K 3/0254; F16K 3/18; F16F 1/12
See application file for complete search history.

(56) References Cited

U.S. PATENT DOCUMENTS 1,278,905 A 9/1918 Gifford
2,478,832 A * 8/1949 McManis ............ F16K 31/1225
251/215
(Continued)

FOREIGN PATENT DOCUMENTS

DE 19723962 A1 12/1998
DE 69518887 T2 7/2001
(Continued)

OTHER PUBLICATIONS

German Patent and Trade Mark Office, Office Action for Application No. 102017108576.9, Jan. 31, 2018, 9 pages, Germany.
(Continued)

*Primary Examiner* — Matthew W Jellett
*Assistant Examiner* — Christopher D Ballman
(74) *Attorney, Agent, or Firm* — Alston & Bird LLP

(57) ABSTRACT

Provided is a gate valve for industrial plants, in particular for chemical and petrochemical plants. This gate valve comprises a slide rod, which is movable in the axial direction, at least one slide plate for closing the gate valve and at least one pressing member. The pressing member is connected to the slide rod and presses the slide plate against a sealing seat. Furthermore, the gate valve comprises a spring element for acting on the pressing member with a release force and a fixing element which is arranged on the slide rod for transmitting power between slide rod and spring element. The gate valve according to the invention comprises a fixing disc as a fixing element, which surrounds the slide rod and is positively connected to the slide rod.

19 Claims, 5 Drawing Sheets

(51) Int. Cl.
*F16F 1/12* (2006.01)
*F16K 3/314* (2006.01)

(56) References Cited

U.S. PATENT DOCUMENTS

| | | | | |
|---|---|---|---|---|
| 3,415,418 | A * | 12/1968 | Tuyl | B24C 7/0053 |
| | | | | 222/57 |
| 3,572,678 | A | 3/1971 | Jerz, Jr. | |
| 3,951,391 | A | 4/1976 | Papousek | |
| 4,372,333 | A * | 2/1983 | Goans | E21B 29/04 |
| | | | | 137/1 |
| 4,601,457 | A * | 7/1986 | Austin | F16K 31/1225 |
| | | | | 251/63 |
| 4,651,970 | A * | 3/1987 | Sadler | E21B 29/04 |
| | | | | 251/297 |
| 4,744,386 | A * | 5/1988 | Frazer | F16K 31/1221 |
| | | | | 137/315.29 |
| 4,925,154 | A * | 5/1990 | Baker | F16K 3/0254 |
| | | | | 251/243 |
| 5,435,520 | A | 7/1995 | Vyvial | |
| 5,908,046 | A * | 6/1999 | Mosman | F16K 41/02 |
| | | | | 137/312 |
| 6,401,747 | B1 * | 6/2002 | Cain | F16K 3/0254 |
| | | | | 137/329.03 |
| 6,892,747 | B2 * | 5/2005 | Dulin | E03B 7/12 |
| | | | | 137/62 |
| 7,992,804 | B2 * | 8/2011 | Nauels | A47K 5/1208 |
| | | | | 239/349 |
| 9,702,469 | B2 * | 7/2017 | Burgess | F16K 3/02 |
| 9,822,886 | B2 * | 11/2017 | Dulin | F16K 31/002 |
| 2008/0060511 | A1 | 3/2008 | Weiner et al. | |
| 2014/0003914 | A1 * | 1/2014 | Namous | F16D 7/08 |
| | | | | 415/123 |
| 2015/0308536 | A1 | 10/2015 | Smith | |
| 2016/0303570 | A1 * | 10/2016 | Jokiranta | B02C 1/025 |

FOREIGN PATENT DOCUMENTS

| | | |
|---|---|---|
| DE | 102005004897 A1 | 8/2006 |
| DE | 202016102559 U1 | 7/2016 |
| FR | 1213840 A | 4/1960 |
| GB | 190008206 A | 9/1900 |

OTHER PUBLICATIONS

European Patent Office, European Search Report for Application No. 18166128.1, dated Sep. 13, 2018, 8 pages, Germany.

* cited by examiner

GATE VALVE, FIXING ELEMENT AND METHOD FOR MOUNTING A GATE VALVE

CROSS REFERENCE TO RELATED APPLICATIONS

This application claims priority to and the benefit of German Patent Application No. 10 2017 108 576.9, filed on Apr. 21, 2017, the contents of which as are hereby incorporated by reference herein in their entirety.

BACKGROUND

Related Field

The invention relates to a gate valve with the features of the preamble of claim 1. A gate valve having the features of the preamble of claim 1 is known for example from DE 20 2016 102 559 U1. The invention further relates to a fixing element and a method for mounting a gate valve.

Description of Related Art

For shutting off large lines in industrial plants, in particular in chemical and petrochemical plants, gate valves with slide plates are used, the diameter of which corresponds essentially to the diameter of the line to be closed.

In addition to single-plate gate valves with a single slide plate, double-plate gate valves with two slide plates are known, which are arranged in a plate basket. In double-plate gate valves, the slide plates are pushed apart in the shut-off position by a wedge arrangement between the slide plates and pressed against the corresponding housing sealing seats. The wedge arrangement is actuated by the slide rod which moves the plate basket with the slide plates. In order to reduce the pressing force during the opening and closing operation, the wedge arrangement is subjected to a release force, which is applied by a spring element which is arranged between the plate basket and the slide rod and relieves the wedge arrangement.

The challenge with gate valves is on the one hand to produce a good sealing effect and on the other hand to allow the easiest possible mobility during opening and closing, so that the slide can be safely and reliably operated. The easy mobility together with low wear of the slide plate or plates is achieved by the spring element, which reduces the spreading effect and thus the pressing force during movement of the slide plate or plates. The pressing force is adjusted depending on the pressure conditions prevailing in the pipes connected to the gate valve in order to achieve sufficient tightness.

The gate valve according to the aforementioned DE 20 2016 102 559 U1 has a pressure plate and a clamping element. The pressure plate is arranged for uniform force transmission between the spring element and the clamping element, which is usually made of steel. The clamping element is firmly positioned on the slide rod, fixes the pressure plate and transmits the force between the slide rod and spring element.

At certain thermal loads and under a hydrogen-containing atmosphere, the material of the clamping elements can become brittle, so that it tends to crack. This reduces the clamping force of the clamping element. At least the easy movement of the gate valve is impaired.

BRIEF SUMMARY

The invention is therefore based on the object of improving a gate valve of the type mentioned above so that the mobility and safety of the gate valve is maintained even under critical thermal and chemical situations. The invention is further based on the object of providing a fixing element for a gate valve and a method for mounting a gate valve.

According to the invention this object is achieved by a gate valve according to claim 1. With a view to the fixing element, this object is achieved by the subject matter of claim 14. With regard to the method for mounting a gate valve, this object is achieved by the subject matter of claim 16.

The invention is based on the idea of specifying a gate valve for industrial plants, in particular for chemical and petrochemical plants. This gate valve comprises a slide rod, which is movable in the axial direction, at least one slide plate for closing the gate valve and at least one pressing member. The pressing member is connected to the slide rod and presses the slide plate against a sealing seat. Furthermore, the gate valve comprises a spring element for acting on the pressing member with a release force and a fixing element which is arranged on the slide rod for transmitting power between slide rod and spring element. The gate valve according to the invention comprises a fixing disc as a fixing element, which surrounds the slide rod and is positively connected to the slide rod.

The invention has the advantage that the position of the fixing disc on the slide rod is retained by the positive connection even if the formation of cracks occurs in the material of the fixing disc. The invention is at least less susceptible to cracking than the known gate valve. The preset pre-tensioning of the spring element is retained.

The term "positive connection" means that the cohesion of the fixing disc and the slide rod is ensured without constantly effective forces (pre-tensioning) by the shape of the parts. This is true for the two-sided positive fit, in which the cohesion acts in two axial directions, as well as for a one-sided positive fit in which the cohesion acts in a single axial direction. In contrast to the positive connection, the cohesion of the components is achieved by constantly acting (external) forces in the non-positive connection.

The gate valve according to the invention is preferably a double gate valve. The gate valve according to the invention can also be a single-gate valve. The fixing element is a fixing disc which is connected in a positive-locking manner to the slide rod and which is distinguished from the friction-locked clamping element according to the prior art by a surprisingly significantly longer retention at the predicted position. In the context of this invention, the term fixing disc is used. The preferred shape is the round shape. However, the fixing disc is not necessarily round, it may for example be rectangular.

Preferred yet exemplary embodiments of the invention are specified in the sub-claims.

Preferably, the fixing disc comprises a plurality of disc segments. Particularly preferred are 2 to 4 disc segments. Particularly preferably, the disc segments are identical in shape. This has the advantage of easy installation and easy replacement of parts of the fixing disc. The individual disc segments can be easily mounted on the slide rod or removed from it. To replace individual disc segments of the spacer disc, it is sufficient to loosen appropriate screws. Further measures to fix the other structures need not be made.

Preferably, the positive connection comprises at least one groove in the slide rod. At least one inner edge of the fixing disc engages in this at least one groove. This results in the positive connection between the slide rod and fixing disc, which ensures a constant positioning of the fixing disc on the slide rod even when moving the slide rod along its axis (two-sided positive connection).

In a preferred embodiment, a groove extends over the entire circumference of the slide rod. In other words, it concerns a completely circumferential groove. In this groove engages at least one inner edge of the fixing plate, resulting in the positive connection between the slide rod and fixing disc (two-sided positive connection). An advantage of this embodiment is the uniform and material-sparing force distribution and easier production.

In another embodiment, at least one groove extends over a partial circumference of the slide rod. In such an embodiment, at least one inner edge of the fixing disc engages in each groove. This results in a positive connection between the slide rod and fixing disc (two-sided positive connection). In terms of good power transmission and material conservation, the use of a plurality of grooves is particularly advantageous in such an embodiment.

In another embodiment, the slide rod forms at least one shoulder on its circumference. In other words, the slide rod is widened at one point and forms there a side surface approximately perpendicular to the axis of the slide rod. The fixing disc rests on this shoulder and is thus positively connected to the slide rod (one-sided positive connection). The shoulder is arranged so that the fixing disc is located between the shoulder and the spring element. Preferably, the shoulder is circumferential, which has the advantages of a uniform and material-conserving force distribution and simpler manufacturing and assembly.

In one embodiment, the slide rod has an external hexagonal shape at least in sections in the longitudinal direction, to which the fixing disc is designed to be complementary. One advantage is that the disc segments of the fixing disc are particularly well fixed in the circumferential direction on the slide rod. The external hexagonal shape can be combined with the groove or the shoulder.

In one embodiment, the plurality of disc segments of the fixing disc is interconnected by at least one bolt. The at least one bolt penetrates the slide rod. The at least one fixed bolt leads on the one hand to the connection of the disc segments to a fixing disc and on the other hand to a positive connection between the fixing disc and the slide rod. Since this positive connection can be easily combined with other positive connections, a particularly stable and durable connection between fixing disc and slide rod is obtained. In addition, the disc segments of the fixing disc are directly connected, which ensures their exact positioning better.

In a preferred embodiment, a pressure plate is arranged between the fixing disc and the spring element. The pressure plate is used for uniform force transmission between the fixing disc and spring element. Moreover, the pressure plate is important for quick assembly of the gate valve and its easy maintenance.

In addition, in a further embodiment, at least one spacer disc is arranged between the fixing disc and the pressure plate. The advantage is that the pre-tensioning can be precisely adjusted by the thickness of the spacer disc and or by the number of spacer discs.

In a preferred embodiment, the pressure plate and the fixing disc, in particular the intermediate spacer disc, are axially connected to each other. Particularly preferably, the connection is effected by means of screws. This simple connection leads to a permanent and stable attachment and a uniform force transmission to the spring element. Especially when using a fixing disc and a spacer disc with a plurality of disc segments, good fixing of the individual segments is important. At the same time, the screw connection can also be quickly released during maintenance work.

In a further preferred embodiment, the spacer disc comprises several, particularly preferably 2 to 4, disc segments. The disc segments can be identical in shape. This has the advantage of easy assembly and easy replacement of worn parts. It is particularly advantageous that a spacer disc of a different thickness can be installed quickly to adjust the pre-tensioning of the spring element.

Preferably, the disc segments of the spacer disc and the disc segments of the fixing disc are twisted with respect to each other. In other words, the separating joints of the disc segments of the fixing disc do not lie on the separating joints of the disc segments of the spacer disc. Particularly preferably, the disc segments are arranged so that the separating joints of the disc segments of the two discs have the widest possible distance. This means that with respect to each two disc segments in the spacer disc and fixing disc, the disc segments are rotated by about 90° to each other. With three disc segments each, the disc segments are rotated by about 60° to each other and with four disc segments by about 45°. From this it is not deducible that spacer disc and fixing disc must consist of the same number of disc segments. By rotating the disc segments, irregularities are compensated and a uniform power transmission is ensured.

Preferably, the pressure plate comprises at least two forks, which protrude radially outward. Particularly preferably, the forks are formed on opposite sides in an approximately horizontal direction. During assembly of the gate valve, during the replacement of individual disc segments of the fixing disc or spacer disc, or during the replacement of the spacer disc by a disc of a different thickness to adjust the pre-tensioning of the spring element, the pressure plate can be fixed by means of forks. For this purpose, a threaded rod, which is fixed on the side of the spring element on the remaining gate valve, is pushed between the two prongs of a fork, and fixed on the other side of the pressure plate, each with a nut. Then the desired action is taken. After attaching the spacer disc and the fixing disc and their attachment, the nuts are loosened and the threaded rods removed. The forks are therefore required for assembly, maintenance or dismantling.

The invention is further based on the idea of specifying a fixing element for a gate valve, in which the fixing element comprises a fixing disc with a plurality of disc segments, wherein the fixing disc is positively connectable to the slide rod.

The fixing element allows easy installation or the simple replacement of individual parts, due to the use of disc segments. Another advantage is the positive connection to the slide rod, whereby the intended positioning on the slide rod, even in the formation of cracks, is secured. For further advantages of the fixing element, reference is made to the above statements.

The invention is also based on the idea of specifying a gate valve for use in an industrial plant, in particular a chemical and petrochemical plant, a coal gasification plant, an incinerator or a pipeline. For the advantages of this gate valve, reference is made to the above statements.

In addition, the invention is based on the idea of specifying a method for mounting a gate valve. First, the pressure plate and the spring element are fixed with at least two threaded rods and nuts. Then the disc segments of the spacer disc are attached to the pressure plate. Preferably, the disc segments of the spacer disc are then rotated about the axis of the slide rod. This is particularly preferably 45-90°. Then the disc segments of the fixing disc are attached to the spacer disc, wherein the fixing disc is positively connected to the slide rod. Next, the pressure plate and the fixing disc are bolted. Finally, the nuts and the threaded rods are removed from the pressure plate.

An advantage of the method is that a gate valve is obtained, in which the intended positioning of the fixing disc is ensured by the positive connection between the fixing disc and slide rod even when the material is brittle and cracks occur. Thus, the power transmission from the slide rod to the spring element is sufficiently secured up to a significantly advanced degree of embrittlement. Surprisingly, the positive connection has proven to be less susceptible to cracking than the clamping connection used in the prior art. Furthermore, the method allows simple mounting of the gate valve, easy maintenance and easy adjustment of the thickness of the spacer disc. By clamping the spring element and the pressure plate with the threaded rods, nuts and the forks, any or all screws can be loosened from the pressure plate, spacer and fixing disc. This allows individual or all disc segments of a disc to be removed and replaced. Also, a spacer disc with a different thickness can be easily installed to adjust the pre-tensioning. Subsequently, the functional state is quickly restored by re-screwing and loosening the threaded rods.

BRIEF DESCRIPTION OF THE FIGURES

The various embodiments of the invention will be explained in more detail below by means of embodiments with reference to the accompanying schematic drawings, wherein.

DETAILED DESCRIPTION OF VARIOUS EMBODIMENTS

Figure 1:
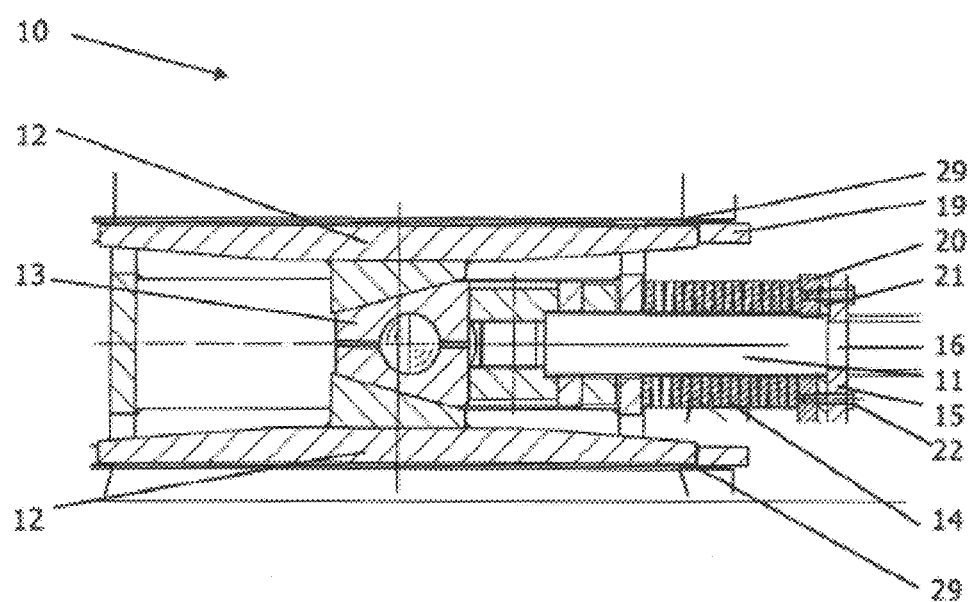
FIG. 1 shows a section of a gate valve according to an embodiment according to the invention.

FIG. 1 shows a gate valve 10 with a plate basket 19, in which two slide plates 12 abut sealing seats 29. Between the slide plates 12, a pressing member 13, e.g. a wedge assembly, is arranged. The pressing member 13 is connected to a slide rod 11. On the slide rod 11, a spring element 14, in this example a disc spring package, a pressure plate 20, a spacer disc 21 and a fixing disc 15 are arranged. The fixing disc 15 is positively connected via a completely circumferential groove 16 to the slide rod 11. The connection between the fixing disc 15, spacer disc 21 and pressure plate 20 is provided by means of screws 22.

The slide rod 11 is movable in the axial direction and drives when pressed the pressing member 13 against the slide plates 12. Thus, the slide plates 12 are pressed in a spreading movement against the sealing seats 29, resulting in a good sealing effect in the closed position of the gate valve. The spring element 14 acts on the pressing member 13 with a release force. During a movement of the plate basket 19, the spring element 14 brings the pressing member 13 to a rest position. In the rest position, the spreading effect and thus the contact pressure, which presses the slide plates 12 against the sealing seats 29, is reduced or completely canceled. In this case, the pressing member 13 is moved away from the slide plates 12 so far that the slide plates 12 are released from the sealing seats 29. Consequently, the slide plates 12 can be moved freely, especially during the closing process. In the closed position, the plate basket 19 is pressed by the slide rod 11 against a stop (not shown). The spring element 14 is compressed and generates the contact pressure.

The power transmission between slide rod 11 and spring element 14 occurs via the fixing disc 15, the spacer disc 21 and the pressure plate 20. The fixing disc 15 is positively connected by a completely circumferential groove 16 to the slide rod 11, whereby a constant positioning of the fixing disc 15 and a uniform pre-tensioning of the spring element 14 are secured.

Figure 2:
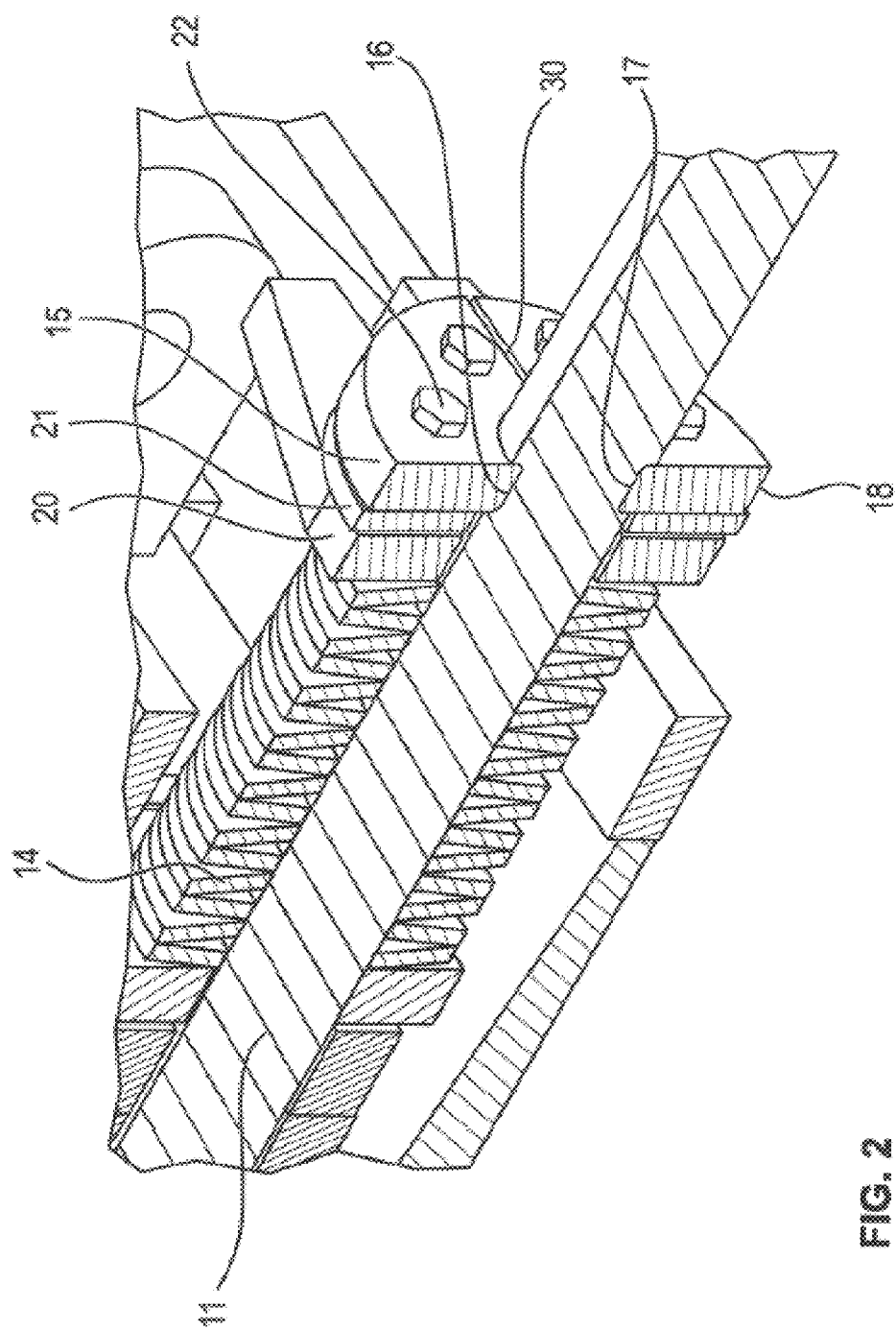
FIG. 2 shows a detail of the gate valve according to FIG. 1.

FIG. 2 shows the completely circumferentially extending groove 16 of the slide rod 11 of the above gate valve 10. The slide rod 11 and adjacent structures are shown in intersection along the slide rod axis for illustrative purposes. Preferably, and as shown in this example, the groove extends in a plane perpendicular to the axis of the slide rod. The inner edge 17 of the fixing disc 15 engages in the completely circumferential groove 16 and connects the two parts in positive-locking manner. In this example, the width of the groove corresponds to the thickness of the fixing disc 15.

The outer edge 18 of the fixing disc limits the fixing disc 15 radially outward. The pressure plate 20 is disposed between the fixing disc 15 and the spring element 14, i.e. a disc spring package. There is a spacer disc 21 between the fixing disc 15 and the pressure plate 20. A separating joint 30 shows that the fixing disc 15 comprises two disc segments. The spacer disc 21 also includes two disc segments in this example. The connection between the fixing disc 15, spacer disc 21 and pressure plate 20 occurs by means of screws 22.

The fixing disc 15, the spacer disc 21 and the pressure plate 20 serve to transfer power between the slide rod 11 and the spring element 14. They cause the pre-tensioning of the spring element 14, so that the spring element generates the release force on the pressing member 13. Due to the positive connection of the fixing disc, its intended positioning is secured, even with material embrittlement, and thus a constant pre-tensioning of the spring element 14. Due to the disc thickness of a selected spacer disc 21, a precise adjustment of the pre-tensioning of the disc spring package is possible. The pressure plate 20 allows uniform force transmission to the spring element 14. It is possible to install spacer discs of different thicknesses for adjusting the pre-tensioning quickly. In addition, it is possible to quickly replace disc segments of the fixing disc 15 and the spacer disc 21. To replace individual disc segments of the spacer disc 21, it is sufficient to loosen the corresponding screws. Further measures for fixing the other structures need not be made, since the remaining disc segment still fixes the spacer disc 21, the pressure plate 20 and the spring element 14. This leads to a further advantage over the prior art, in which the removal of the clamping element leads to the release of further parts.

The invention is generally applicable to a fixing element for a gate valve. The fixing element is characterized in that it comprises a fixing disc with a plurality of disc segments, wherein the fixing disc is positively connectable to the slide rod.

The main advantages of the fixing element are: Easy installation, or easy replacement of the fixing disc, due to the use of disc segments. In addition, a positive connection to the slide rod is provided, thus securing the intended positioning on the slide rod, even with the formation of cracks. For further advantages of the fixing, reference is made to the above statements.

The described gate valve is used in an industrial plant, in particular a chemical and petrochemical plant, a coal gasification plant, an incinerator or a pipeline. For the advantages of this gate valve, reference is made to the above statements.

Figure 3:
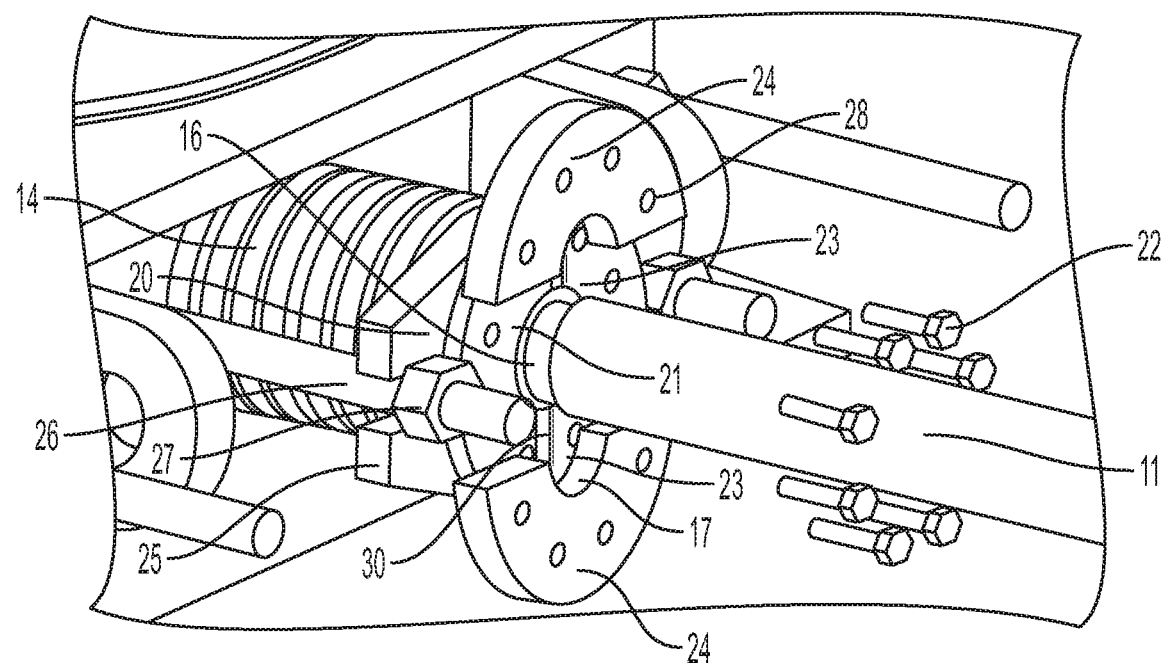
FIG. 3 shows a detail of the gate valve of FIG. 1 during assembly or maintenance.

FIG. 3 shows the completely circumferential groove 16 during the assembly or maintenance of the above gate valve 10. The fixing disc consists of two disc segments 24 which each have four through holes 28. The disc segments 24 of the fixing disc are inserted into the completely circumferential groove 16, resulting in the fixing disc and the positive connection. The pressure plate 20 forms two forks 25 which protrude horizontally and radially outward. In this example, the spacer disc comprises two disc segments 23, which also each have four through holes. The disc segments 23 of the spacer disc are added from above and below and then rotated 90° about the axis of the slide rod. The two disc segments 24 of the fixing disc are also added from above and below, whereby the disc segments 24 of the fixing disc and the disc segments 23 of the spacer disc are rotated by 90° to each other. In other words, the separating joints 30 of the disc segments are not consecutive.

After rotating the disc segments, the through holes 28 of the fixing disc and spacer disc are each arranged one above the other and in line with the internal threads of the pressure plate, and the fixing disc, the spacer disc and the pressure plate are screwed to the screws 22.

The spring element 14, which is a disc spring package, is clamped during assembly of the gate valve 10 by the pressure plate 20. This is achieved try fixing the pressure plate 20 by means of two threaded rods 26, nuts 27 and the forks 25 of the pressure plate 20. Here, the threaded rods are fixed on the side of the spring element to other components of the gate valve. Each threaded rod is guided by a fork of the pressure plate and fixed on the side facing away from the spring element with a nut. In the final step of assembly, the threaded rods 26 and nuts 27 are removed.

As described in detail above, this method enables quick assembly and easy maintenance of the gate valve. The product with positive connection ensures the intended arrangement of the fixing disc and a constant pre-tensioning of the spring element.

Figure 4:
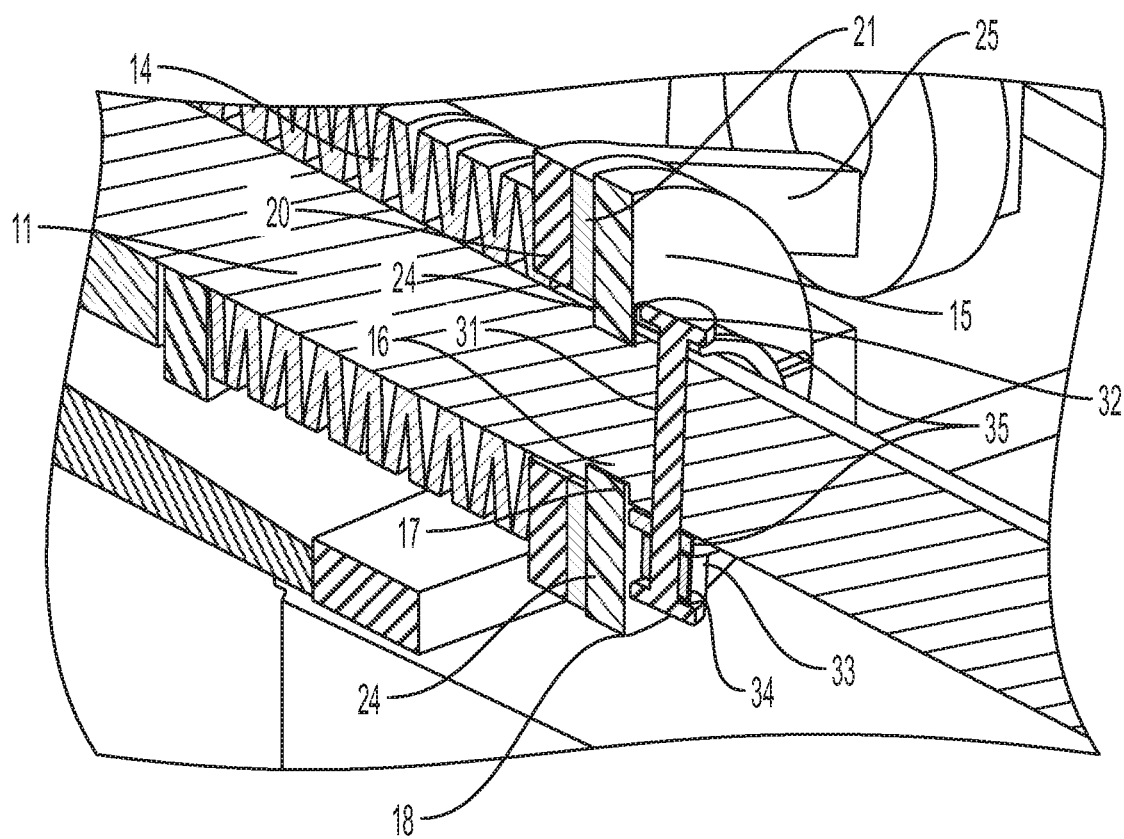
FIG. 4 shows a detail of another embodiment of a gate valve according to the invention with two positive connections between the slide rod and fixing disc.

FIG. 4 shows a detail of another embodiment of a gate valve according to the invention. In this example, a bolt 31 and two disc segments 24 are used, which is the preferred embodiment. Thus, the two disc segments 24 of the fixing disc 15 are connected to each other by a bolt 31, wherein the bolt 31 penetrates the slide rod 11. In this example, the bolt 31 is a bolt with a bolt head 32, and is fixed on the other side of the slide rod 11 with a washer 33 and a nut 34. The disc segments 24 of the fixing disc 15 have contact surfaces 35 for the bolt head 32, the washer 33 and the nut 34. Preferably and as shown in this example, the bearing surfaces 34 protrude in the axial direction of the disc segments 24 and surround the slide rod 11. The fixed pin 31 provides a connection of the disc segments 24 to a fixing disc 15 and a positive connection between the fixing disc 15 and the slide rod 11. Although not absolutely necessary, the fixing disc 15 still comprises another positive connection to the slide rod 11 in this example. The fixing disc 15 engages with its inner edge 17 in a completely circumferential groove 16 of the slide rod 11. Also conceivable is a second positive connection in the form of a shoulder which is formed on the circumference of the slide rod, and against which the fixing disc rests.

The two positive connections in this example, in addition to the generally mentioned advantages, produce a particularly stable and permanent connection between the fixing disc 15 and slide rod 11. In addition, the disc segments 24 of the fixing disc 15 are directly connected to each other, which better ensures their exact positioning.

In the examples so far, the slide rod 11 is round. However, this should not constitute a limitation of the scope of this application. The slide rod 11 may be square in part or in full, or have other shapes. The fixing disc is adapted in shape accordingly.

Figure 5:
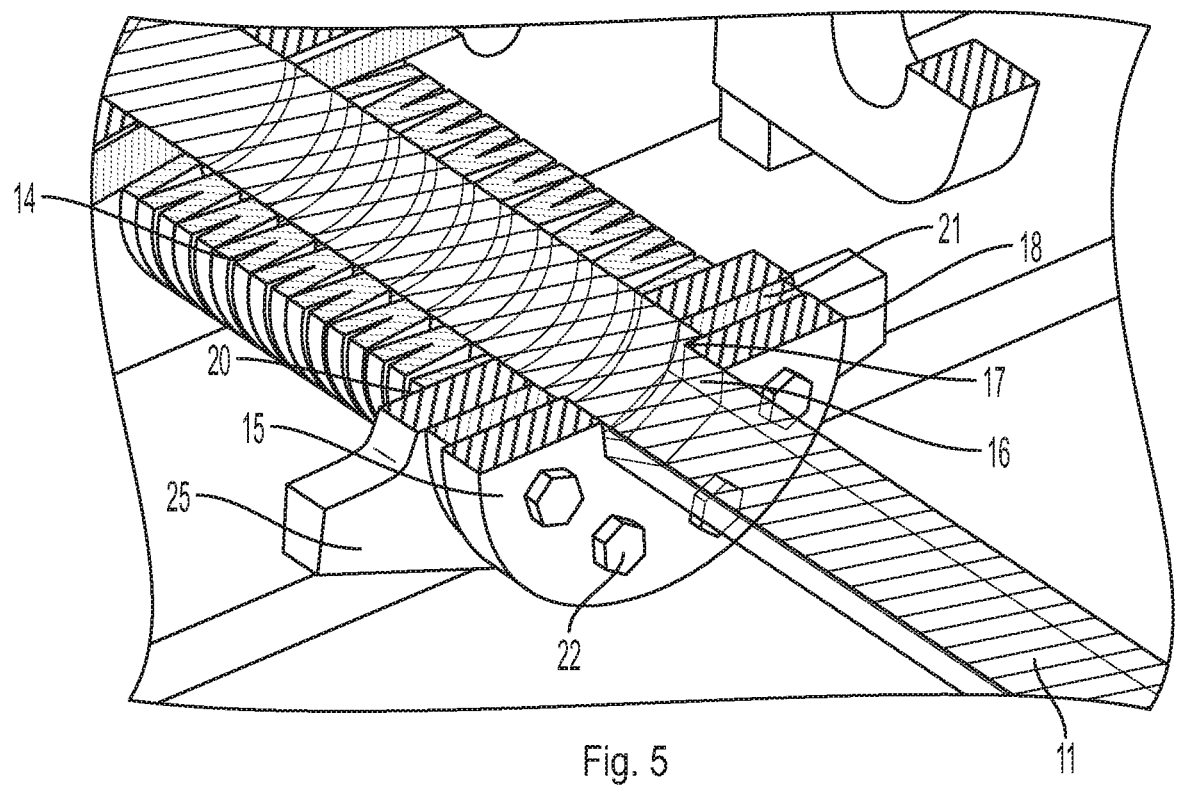
FIG. 5 shows a detail of another embodiment of the gate valve according to the invention with a slide rod in hexagonal shape.

FIG. 5 illustrates a detail of another embodiment of a gate valve according to the invention. The slide rod 11 has an external hexagonal shape at least in sections in the longitudinal direction, to which the fixing disc 15 is formed in a complementary manner. The external hexagonal shape extends at least in sections, in particular completely, in the circumferential direction of the slide rod. In other words, the external hexagonal shape represents, at least in sections, the outer shape or the outer contour of the slide rod. In yet other words, the slide rod has six equal side surfaces at least over a section in the longitudinal direction of the slide rod, which side surfaces extend parallel to the axis of the slide rod 11. In this example, the external hexagonal shape of the slide rod 11 extends in the longitudinal direction of the slide rod 11 across the width of the fixing disc 15. The external hexagonal shape of the slide rod 11 may extend in the longitudinal direction of the slide rod 11, but also beyond the width of the fixing disc 15.

| | List of reference numerals |
|---|---|
| 10 | Gate valve |
| 11 | Slide rod |
| 12 | Slide plate |
| 13 | Pressing member |
| 14 | Spring element |
| 15 | Fixing disc |
| 16 | Completely circumferential groove |
| 17 | Inner edge of fixing disc |
| 18 | Outer edge of fixing disc |
| 19 | Plate basket |
| 20 | Pressure plate |
| 21 | Spacer disc |
| 22 | Screw |
| 23 | Disc segment of spacer disc |
| 24 | Disc segment of fixing disc |
| 25 | Fork |
| 26 | Threaded rod |
| 27 | Nut |
| 28 | Through hole |
| 29 | Sealing seat |
| 30 | Separating joint |
| 31 | Bolt |
| 32 | Bolt head |
| 33 | Washer |
| 34 | Nut |
| 35 | Bearing surface |

The invention claimed is:

1. Gate valve (10) for industrial plants, the gate valve comprising:
   a slide rod (11) movable in an axial direction,
   at least one slide plate (12) for closing the gate valve (10),
   at least one pressing member (13) connected to the slide rod (11) to press the slide plate (12) against a sealing seat (29), a spring element (14) for acting on the pressing member (13) with a releasing force, and a fixing element arranged on the slide rod (11) and configured for transmitting power between the slide rod (11) and spring element (14), wherein:

the fixing element comprises a fixing disc (15), which surrounds the slide rod (11), has a set of through holes (28) passing therethrough, and has a two-sided positive connection with a portion of the slide rod (11), the fixing disc (15) comprises a plurality of disc segments (24), at least one inner edge (17) of the fixing disc (15) radially engages the portion of the slide rod (11) to provide the positive connection, the portion of the slide rod (11) providing the two-sided positive connection comprises at least one groove (16) in the slide rod (11), the at least one inner edge (17) of the fixing disc (15) engages the at least one groove (16) in the slide rod (11) to provide the two-sided positive connection, a thickness of the fixing disc (15) is the same as a width of the at least one groove (16);

a pressure plate (20) is positioned between the fixing disc (15) and the spring element (14); and the pressure plate (20) and the fixing disc (15) are axially connected to each other via screws extending through the set of through holes (28).

2. Gate valve (10) according to claim 1, wherein the fixing disc (15) comprises two to four disc segments (24).

3. Gate valve (10) according to claim 1, wherein the at least one groove (16) extends over the entire circumference of the slide rod (11).

4. Gate valve (10) according to claim 1, wherein the at least one groove (16) extends over a partial circumference of the slide rod (11).

5. Gate valve (10) according to claim 1, wherein the portion of the slide rod (11) providing the positive connection comprises at least one shoulder which is formed on the circumference of the slide rod (11) and against which the fixing disc (15) rests.

6. Gate valve (10) according to claim 1, wherein:
the slide rod (11) has an external hexagonal shape at least in sections in the longitudinal direction, and
the fixing disc (15) is designed to be complementary to the external shape of the slide rod.

7. Gate valve (10) according to claim 1, wherein:
the plurality of disc segments (24) of the fixing disc (15) are interconnected by at least one bolt (31), and
the at least one bolt (31) penetrates the slide rod (11).

8. Gate valve (10) according to claim 1, wherein at least one spacer disc (21) is arranged between the fixing disc (15) and the pressure plate (20).

9. Gate valve (10) according to claim 8, wherein the pressure plate (20), the fixing disc (15), and the spacer disc (21) are axially connected to each other.

10. Gate valve (10) according to claim 9, wherein the pressure plate (20), the spacer disc (21), and the fixing disc (15) are collectively connected via the screws.

11. Gate valve (10) according to claim 8, wherein the spacer disc (21) comprises a plurality of disc segments (23).

12. Gate valve (10) according to claim 11, wherein the plurality of disc segments (23) of the spacer disc (21) and the plurality of disc segments (24) of the fixing disc (15) are twisted relative to each other.

13. Gate valve (10) according to claim 8, wherein the spacer disc (21) comprises two to four disc segments (23).

14. Gate valve (10) according to claim 1, wherein the pressure plate (20) has at least two forks (25) which protrude radially outwards.

15. Use of a gate valve (10) according to claim 1 in an industrial plant, an incinerator, or a pipeline.

16. Fixing element for a slide plate (10), wherein:
the fixing element comprises a fixing disc (15) with a plurality of disc segments (24) and having a set of through holes (28) passing therethrough,
the fixing disc (15) is positively connected to a portion of a slide rod (11) via an inner edge (17) of the fixing disc radially engaging the portion of the slide rod (11),
the portion of the slide rod (11) providing the two-sided positive connection comprises at least one groove (16) in the slide rod (11), the at least one groove (16) being engaged by the inner edge (17) of the fixing disc (15),
a thickness of the fixing disc (15) is the same as a width of the at least one groove (16),
the fixing disc (15) is axially connected to a pressure plate (20) via screws extending through the set of through holes (28), the pressure plate (20) being positioned between the fixing disc (15) and a spring element (14).

17. Method for assembling a gate valve (10) according to claim 1, the method comprising the following steps:
fixing a pressure plate (20) by means of at least two threaded rods (26) and nuts (27) on the spring element (14);
simultaneously attaching disc segments (23) of a spacer disc (21) on the pressure plate (20),
simultaneously attaching the disc segments (24) of the fixing disc (15) to the spacer disc (21), wherein the fixing disc (15) is positively connected to a portion of the slide rod (11) via a radially oriented engagement between an inner edge (17) of the fixing disc and the at least one groove (16) of the slide rod (11);
screwing the pressure plate (20) with the fixing disc (15); and
removing the nuts (27) and the threaded rods (26) from the pressure plate (20).

18. Method of claim 17, wherein the simultaneously attaching of the disc segments (23) on the pressure plate (20) occurs with rotation of the disc segments (23) of the spacer disc (21) about the axis of the slide rod (11).

19. Method of claim 18, wherein the rotation is by 45-90°.

* * * * *